United States Patent [19]

Perrin et al.

[11] Patent Number: 4,907,867
[45] Date of Patent: Mar. 13, 1990

[54] VARIFOCAL OPTICAL SYSTEM AND ASSOCIATED ELECTRO-MECHANICAL CONTROL

[75] Inventors: Jean-Claude Perrin, Macon; Joel Rollin, Vanves, both of France

[73] Assignee: U.S. Philips Corp., New York, N.Y.

[21] Appl. No.: 202,772

[22] Filed: Jun. 3, 1988

[30] Foreign Application Priority Data

Jun. 4, 1987 [FR] France ............................ 87 07797

[51] Int. Cl.⁴ ............................................. G02B 15/14
[52] U.S. Cl. ..................................... 350/429; 354/428
[58] Field of Search ............... 350/429, 430, 253; 354/428, 400

[56] References Cited

U.S. PATENT DOCUMENTS

| | | | |
|---|---|---|---|
| 4,037,234 | 7/1977 | Tunekawa et al. | 354/428 |
| 4,161,756 | 7/1979 | Thomas | 350/429 |
| 4,193,667 | 3/1980 | Yasukuni et al. | 350/429 |
| 4,668,069 | 5/1987 | Hasegawa | 354/428 |
| 4,697,891 | 10/1987 | Kawai | 350/429 |

FOREIGN PATENT DOCUMENTS

| | | | |
|---|---|---|---|
| 0172216 | 7/1988 | Japan | 350/429 |
| 2141260 | 12/1984 | United Kingdom . | |

Primary Examiner—Bruce Y. Arnold
Assistant Examiner—Loha Ben
Attorney, Agent, or Firm—William L. Botjer

[57] ABSTRACT

This varifocal optical system is electro-mechanically controlled to vary focal distance, temperature correction focussing and finite distance focussing. It is constituted by four single lenses (L1, L2, L3 and L4) two of which (L2, L3) are movable and are axially translated to vary the magnification, while only one (L3) of these two lenses is adapted for temperature correction focussing and finite distance focussing. It is also consituted by electro-mechanical member (EMM) which are especially adapted to control the movements of the two movable lenses (L2, L3) in a discrete manner.

7 Claims, 4 Drawing Sheets

VARIFOCAL OPTICAL SYSTEM AND ASSOCIATED ELECTRO-MECHANICAL CONTROL

BACKGROUND OF THE INVENTION

The invention relates to a varifocal optical system controlled electro-mechanically for focal distance variation and hence magnification, temperature correction focussing and finite distance focussing.

Such an optical system is known from British Pat. No. 2,141,260. The known system comprises a combination of four groups of lenses, i.e. two fixed groups one of which comprises a plurality of elements and two movable groups one of which also comprise a plurality of elements. The movements of the two movable groups are controlled by preprogrammed computing means to vary the magnification and to compensate for the perturbations due to temperature variations and proximity focussing. The computations performed by these means apply relatively complex interpolation algorithms if the computation data are introduced in the form of discrete digital values.

However, constant effors have to be made to give such systems a greater compactness and a greater simplicity so as to improve their reliability and reduce their cost. In connection with these efforts the known system has the drawback that it requires a considerable number of lens elements as well as a more complex computing means, which is contradictory to the requirement of simplicity and cost reduction.

It is an object of the invention to remedy this drawback and to provide means for reducing both the complexity and the cost of the known system.

SUMMARY OF THE INVENTION

To this end the varifocal optical system of the type described in the opening paragraph is characterized in that it comprises four single element lenses two of which are movable and are axially translated to magnification variation, while only one of the two movable lenses is adapted for temperature correction focussing and finite distance focussing, said system comprising electro-mechanical means for controlling the movement of the two movable lenses in a discrete manner. The system comprises only four lens elements and the temperature variations and proximity focussing for each focal value are compensated by a single movable element (which is also used together with the second movable element to vary the magnification). Moreover, the positions of the movable lenses for the nominal temperature and an object at infinity are stored for a discrete number of focal values after having been computed in such a way that a change from one magnification to the next can hardly be perceived by the human eye. At the nominal temperature and for an object at infinity there is no computation because the values of the positions of the lenses are directly retrieved in preprogrammed instructions. On the other hand the discrete number of focal values is limited, which involves a considerable gain in memory sites when storing the tables of values.

For the same object of simplification and cost reduction the varifocal optical system is characterized in that a definitive convergence adjustment of the two non-movable lenses is carried out during assembly of the system so as to compensate for rotational errors (curvature of the lenses, thicknesses) caused during manufacture of the lenses and for positioning errors of the tubes on which said lenses are mounted. Thus, wider tolerances with respect to these errors are obtained, resulting in moderate costs of realization. The stored values of the positions of the movable lenses are thus solely fixed with respect to the theoretical optical formula and no longer adapted to manufacturing errors, and the stored values are identical for a system having the same optical formula. Moreover, a correction throughout the focal range is obtained.

The varifocal optical system according to the invention is further characterized in that the electro-mechanical means for controlling the movements of the two movable lenses, comprising inter alia a computing unit, take into account for focussing corrections discrete proximity values and discrete temperatures values computed in such a way that the image remains sharp without compensation between two successive values, the corrections being made in terms of elementary increments so that the computing unit is to perform additions only. The latter feature also involves a reduction of costs and a simplification of the system as it is not necessary to carry out any algorithm or complex operation.

BRIEF DESCRIPTION OF THE DRAWING

The invention will now be described in greater detail, by way of example, with reference to the accompanying drawings in which.

DETAILED DESCRIPTION OF THE PREFERRED EMBODIMENTS

Figure 1:
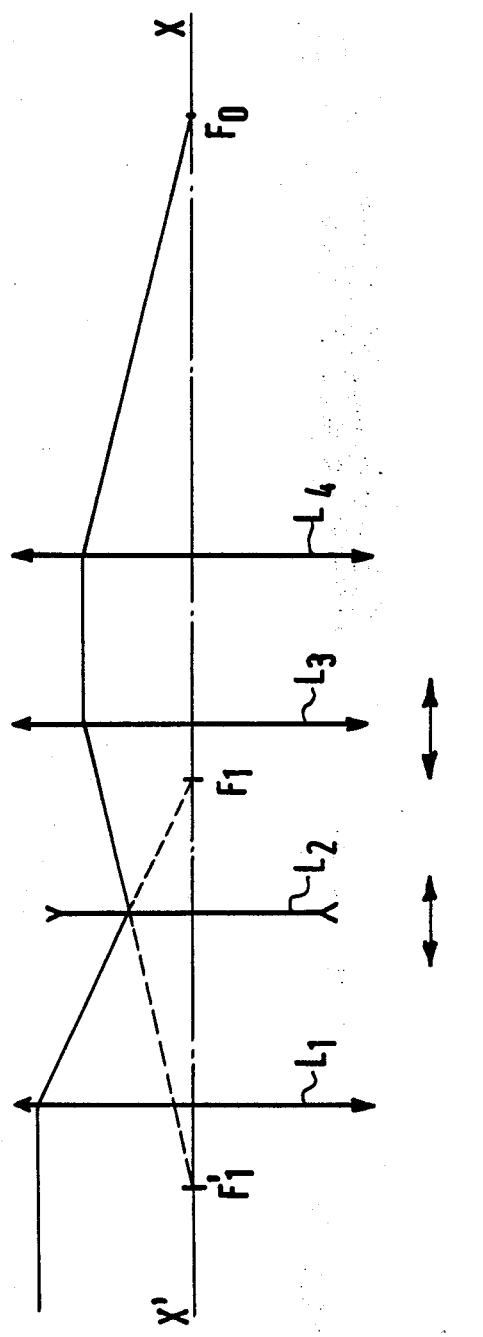
FIG. 1 shows diagrammatically the varifocal optical system according to the invention.

FIG. 1 shows diagrammatically the varifocal optical system according to the invention. According to the invention the optical system comprises four lenses with single elements L1, L2, L3, L4 which are positive, negative, positive and positive, respectively. The lenses L1 and L4 are fixed. The variation of the focal distance, i.e. a zoom effect, is realised by moving the lenses L2 and L3. When the lens L2 is moved, the image F'1 of the focus F1 of the lens L1 formed by the lens L2 is translated on the optical axis XX' and the magnification between F1 and F'1 varies, thus producing the variation of the focal distance and the zoom effect. To preserve a sharp image independently of the position of the lens L2, the lens L3 is also moved in such a way that an image F'1 which has always the same location with respect to the lens L4 is produced so that a sharp image is obtained at Fo, independent of the position of the system. In the computed optical formula for realizing an optical system according to the invention the image of F'1 via the lens L3 is substantially at infinity in the intermediate space between the lenses L3 and L4. The assembly L1, L2, L3 thus is an afocal system having a variable magnification and the position relative to the lens L4 is substantially unimportant. The rules for moving the lenses L2 and L3 as a function of the focal distance of the system are obtained by known optical computations. These are non-linear rules by nature and the movements of the lenses L2 and L3 are preferably programmed in order to follow the computed rules of movement exactly.

Figure 2:
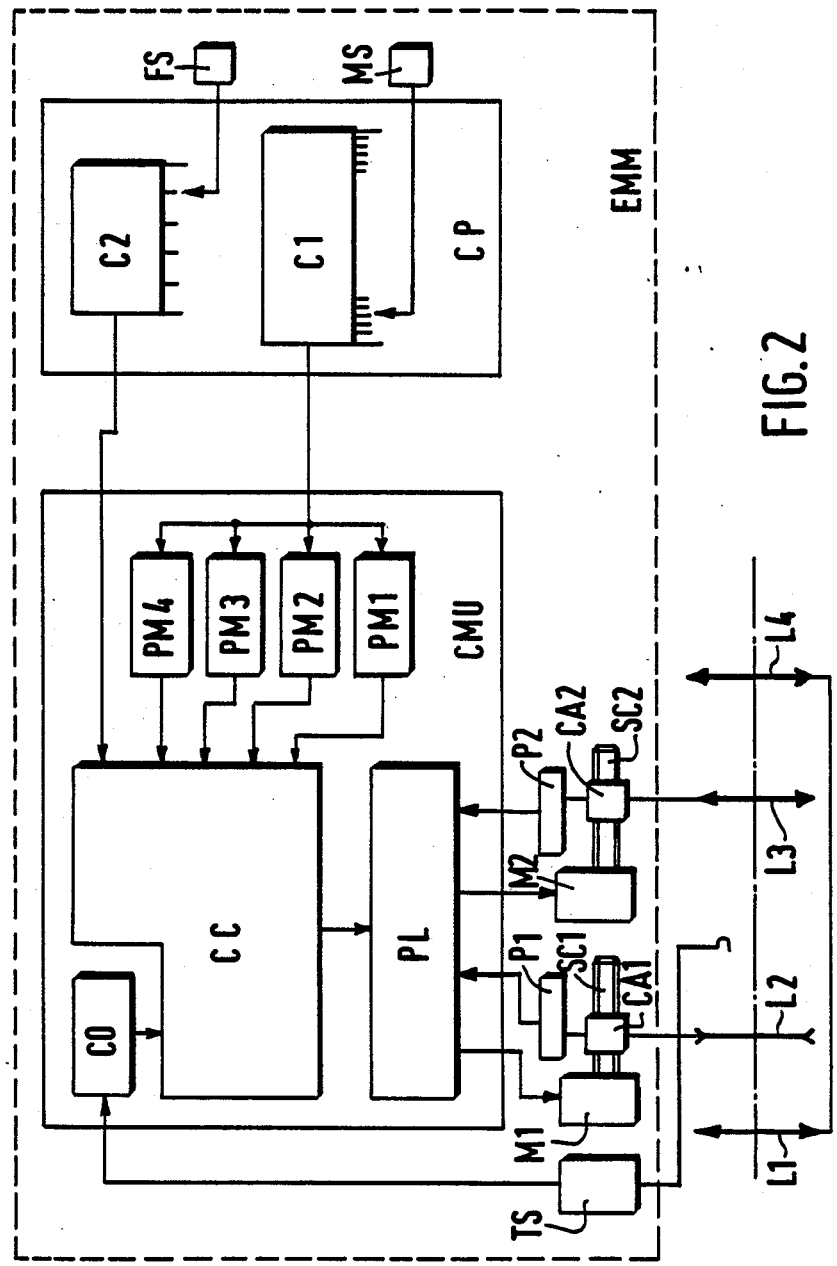
FIG. 2 is the basic circuit diagram of the varifocal optical system.

FIG. 2 is a basic diagram of the varifocal optical system is which the elements which are the same as those in FIG. 1 have identical reference symbols. In the following description the circuit diagram of FIG. 1 will also be referred to. In a conventional system the movement of the lenses L2 and L3 is obtained by means of two helixes threaded in a cylinder. The lenses L2 and L3 are carried by rollers sliding in these helixes and thus moving in accordance with the fixed thread in these helixes. The proximity focussing is generally obtained by moving the lens L1 so that the image is always formed at F1. For this purpose the system is provided with two rings at its periphery, one ring being used for varying the focal distance and the other ring serving for proximity focussing, while the image at Fo is always sharp, independent of the object distance.

A different control mode, taking the following criteria into account, has been chosen for the elaboration of the system according to the invention:

the system is provided with a motor and is telecontrolled, the system should operate in a larger range of temperatures, for example from −40° C. to +80° C., the system should operate for objects of infinity as well as for proximity objects, for example from infinity to 40 m, the real focal distance of the system and thus the field may vary with respect to the focal distance mentioned on the control panel as a function of the temperature and finite distance focussing.

As stated hereinbefore, the lenses L1 and L4 are fixed and the lenses L2 and L3 are movable. According to a feature of the invention a definitive convergence adjustment of the two lenses L1 and L4 is carried out during assembly of the optical system so as to compensate for rotational errors (curvatures of the lenses, thicknesses), caused during manufacture of these lenses and for positioning errors of the tubes on which they are mounted.

According to the invention the lenses L2 and L3 are moved independently and for this purpose the electromechanical means EMM comprise inter alia two motors M1 and M2 supporting two carriages CA1 and CA2 to which the tubes for the lenses L2 and L3 are fixed, while the two motors are connected to the two carriages by means of two screws SC1 and SC2 without clearance (for example, screws RV510/8.1.R3, RV510/8.2.R3 or other screws of the same type manufactured by Rollvis (Geneva)). The instantaneous position of the lenses L2 and L3 is measured by means of two linear potentiometers P1 and P2 which have a sufficient precision and linearity in the entire useful range and in the fixed range of temperatures. The measurements of the potentionmeters P1 and P2 are transmitted to the inputs of a position servo circuit PL, forming part of a computing and memory unit CMU.

The electro-mechanical means also comprise a control panel CP having two control buttons. The first button MS for magnification control, i.e. variation of the focal distance, which in this embodiment comprises 32 positions preferably corresponding to equally distributed focal distance values (the eye registering a progressive passage from a small to a large field in this case), provides the number corresponding to the focal distance demanded by the user at the input of an electronic circuit C1 whose output is connected to a group of PROM-type memories PM1, PM2, PM3, PM4 in the computing and memory unit CMU. The second button FS for focussing control, which comprises 6 positions in this embodiment, provides the number corresponding to the proximity chosen by the user at the input of an electronic circuit C2 whose output is connected to a computing chart CC in the computing and memory unit CMU. An overlap in the field depths is provided so that the image of a detail is not lost when the focussing button FS is moved from one position to the next. Each of the 6 positions of the button FS corresponds to a focussing range, the centre of each range corresponding to the extremity of the next range. In this embodiment the position 0 relates to an object situated at infinity, whilst the position 6 corresponds to a proximity object (for example, at 40 m).

The temperature is measured by means of one (or several) temperature sensors TS located in the proximity of the lenses, the analog measuring signal is converted into a digital signal by means of an analog-to-digital converter C0 in the unit CMU, and the signal thus converted is applied to an input of the computing chart CC for supplying information on the difference between the real temperature and the nominal temperature of 20° C.

In the optical system according to the invention the focussing by temperature corrections and finite distance focussing are carried out with the single lens L3. These corrections can be carried out independently. Optical computations have shown that, as far as temperature correction focussing at a given focal value is concerned, the movements of L3 as a function of temperature are proportional to the difference with respect to the nominal temperature, while the proportional coefficient is not dependent on the proximity of the object and that, as far as finite distance focussing at a given focal value is concerned, the movements correcting the proximity of the object are inversely proportional to its distance, and that at a given focal value the proportional factor does not depend on the temperature. The functions of "temperature correction" and "proximity focussing correction" are thus split up.

For this purpose four tables of 32 elements (one element for each focal distance) are stored in the PROM-type memories PM1, PM2, PM3 and PM4.

In PM1: a table comprising the 32 values of the positions of the lens L2 at a temperature of 20° C. and for an object situated at infinity.

In PM2: a table comprising the 32 values of the positions of the lens L3 at a temperature of 20° C. and for an object situated at infinity.

In PM3: a table representing the differences in positions of the lens L3 for an elementary temperature increment $\Delta X3T$, with the object at infinity.

In PM4: a table representing the differences in positions of L3 for an increment $\Delta X3P$ of the focussing button, at the temperature of 20° C.

Access to an element of the table is authorized by means of the control button MS for varying the focal distance. The outputs of the 4 PROM-type memories are connected to inputs of the computing chart CC.

The computing chart CC supplies the required information to the position servo-control circuit PL for the position servo-control of the lenses L2 and L3, a first output signal of the circuit PL controlling the motor M1 and thus the movement of the lens L2, a second output signal of the circuit PL controlling the motor M2 and thus the movement of the lens L3. At the output of the circuit PL the values X2 and X3 of the positions of the lenses L2 and L3 to be reached for servocontrol (X2 and X3 being the abscissae of the lenses L2 and L3, respectively) are thus obtained, which values X2 and X3 are computed on the basis of the parameters applied to the inputs:

temperature difference from 20° C. (output of the circuit C0).

object distance (controlled by the button FS).

positions X2 and X3 of the lenses L2 and L3 at 20° C. and for an object at infinity.

elementary increments $\Delta X3T$ and $\Delta X3P$.

Moreover, safeties are built in the software to protect it from shocks or lens-position deviations which would be induced by the introduction of erroneous servo-control values.

Figure 3:
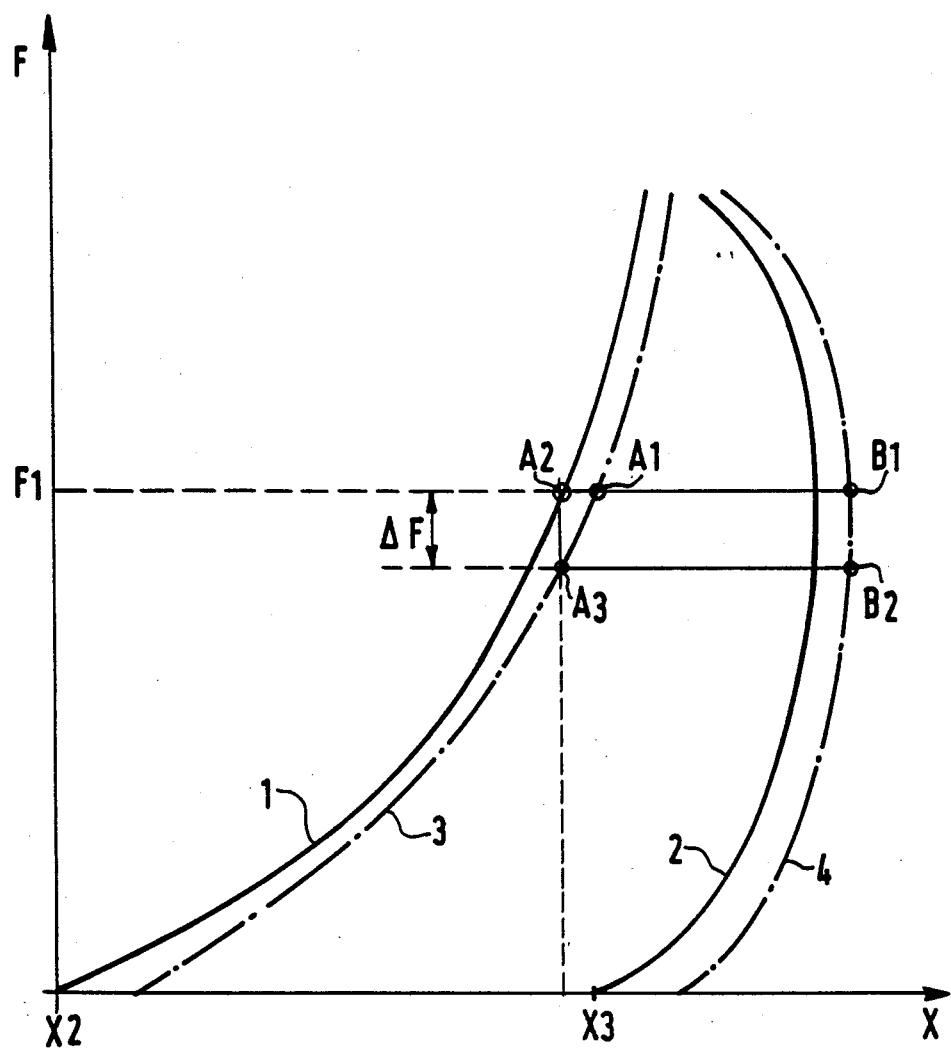
FIG. 3 shows the operating principle for focussing corrections.

FIG. 3 shows by means of curves the operating principle of the system for focussing correction applied to the single lens L3 in accordance with a feature of the invention. In accordance with another characteristic feature, the optical system is characterized in that the temperature corrections for focussing and finite distance focussing corrections are treated in terms of perturbations with respect to the normal configuration: nominal temperature $T=20°$ C. and object situated at infinity, and in that the temperature corrections for focussing are decorrelated with the finite distance focussing corrections, which means that for a temperature $T+\Delta t$ and an object at finite distance a first correction is carried out by refocussing for an object situated at infinity at the temperature $T+\Delta t$, a second correction is carried out by refocussing while taking the proximity of the object into account and fictitiously considering the temperature to be equal to T. Thus the computing unit is considerably simplified.

At the values obtained as a function of the rules of movement computed for infinity focussing and for a temperature of 20° C. there must also be a correction for focussing an object at proximity and for taking the temperature variations with respect to 20° C. into account. For temperatures which are different from 20° C. the values obtained are different and it is possible to plot a network of curves dependent on the temperature. The positions X2 of the lens L2 and X3 of the lens L3 are plotted on the abscissa X, while the focal values F are plotted on the ordinate. X2 and X3 are based on the optical computation as a function of the focal distance mentioned on the control panel CP. Curve 1 represents the variations of X2 (f(X2)) as a function of the focal distances for the temperature $T=20°$ C. and for focussing at infinity, and curve 2 represents the variations of X3 (f(X3)) as a function of the focal distances at $T=20°$ for an object situated at infinity. Curve 3 corresponds to the variations of X2 as a function of the focal distances for a temperature $T+\Delta t$, while curve 4 corresponds to the variations of X3 as a function of the focal distances for the same temperature $T+\Delta t$. At a focal distance F1 given for the temperature $T+\Delta t$, the theoretical positions of the two lenses L2 and L3 are A1 and B1, respectively. The solution chosen fictitiously recovers position X2 corresponding to the focal distance F1 at the nominal temperature $T=20°$ C. and the temperature correction is applied by the lens L3. A1 is thus moved to A2 on the curve 1 at the temperature $T=20°$ C. To ensure the sharpness of the image, A2 is moved to A3 on the curve 3 at $T+\Delta t$ and B1 is moved to B2 on the curve 4 corresponding to $T+\Delta t$, while the final positions A3 and B2 are thus located on the network of curves corresponding to the real temperature $T+\Delta t$.

The focussing and temperature corrections are effected by means of the single lens L3 whose curve showing the variations of the positions comprises a point of return. While a single lens is used for these corrections, the compensations are effected on the lens whose course comprises a point of return (lens L3, curves 2 and 4). Such an approximation gives rise to a slight error $\Delta F$ between the focal distance and the focal distance mentioned on the control panel.

Figure 4:
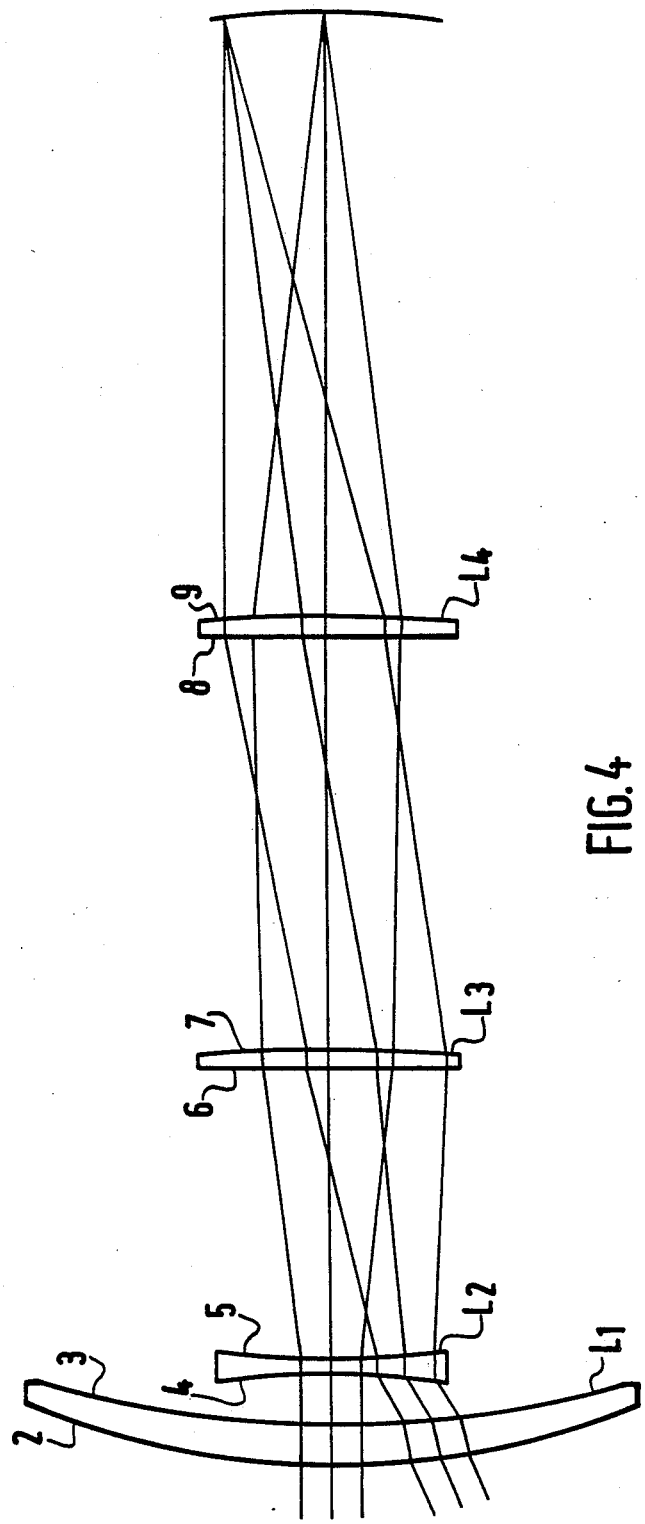
FIG. 4 is an optical diagram of the optical system according to the invention.

Two embodiments of optical systems according to the invention whose diagram is shown in FIG. 4 will now be explained by way of example. In the diagram the optical systems have a short focal length configuration.

In the two embodiments the optical system is an objective zoom lens operating in the spectral band [8 to 12 $\mu$m], adapted to be used at night and mounted, for example on a helicopter for the search of persons lost at sea or in the mountains, or for any other application of this kind.

According to the invention the optical system is composed of 4 lenses L1, L2, L3, L4 and the surfaces of the lenses are denoted by the reference numerals 2 and 3 for L1, 4 and 5 for L2, 6 and 7 for L3 and 8 and 9 for L4.

First embodiment: varifocal system whose field varies between approximately 5° at long focal length and 38° at short focal length (zoom ratio≃8) and whose characteristics are given in the following Table:

|  | Short focal length | Long focal length |
| --- | --- | --- |
| Spectral domain | 8–12 $\mu$m | 8–12 $\mu$m |
| Focal distance (mm) | 52.8 | 429.6 |
| Horizontal field | 37.6° | 4.8° |
| Numerical aperture | 4.1 | 4.1 |
| Vignetting (%) | 0 | 0 |
| Image format | 24 mm × 36 mm | 24 mm × 36 mm |
| Position of the entrance pupil with respect to the first dioptre (mm) | 52.82 | 134.32 |
| Position of the exit pupil with respect to the focal plane (mm) | −222 | −222 |
| MTF (Modulation Transfer Function) on the axis at spatial frequency of 5 mm$^{-1}$ | ≈0.65 | ≈0.7 |

In this embodiment 3 out of the 8 surfaces of the lenses are aspherical, and more specifically they are conical.

The data for the long focal length construction are as follows:

| Number of the surface | Radius | ½ Useful diameter | Next material | Next thickness |
| --- | --- | --- | --- | --- |
| 2 | 172.779 | 58.662 | Ge | 8.659 |
| 3 | conical | 56.929 | Air | 137.533 |
| 4 | conical | 20.191 | Ge | 3.570 |
| 5 | 207.799 | 20.191 | Air | 3.010 |
| 6 | conical | 22.683 | Ge | 3.618 |
| 7 | −434.666 | 22.683 | Air | 16.108 |
| 8 | 1823.132 | 24.874 | Ge | 4.272 |
| 9 | −402.556 | 24.874 | Air | 101.605 | in which "radius" denotes the radius of curvature of the surface, "next thickness" denotes the interval between the said surface and the next surface, which interval is measured along the optical axis, while "radius", "next thickness" and "½ useful diameter" are expressed in mm.

If the equation for meridians of the aspherical surfaces numbered 3, 4 and 6 with respect to a system having orthogonal axes X0Y in which 0 is the apex of the surfaces 3, 4 and 6 and 0X is the optical axis is given by the following general formula, $$X = \frac{\rho Y^2}{1 + \sqrt{(1 - (K + 1)\rho^2 Y^2)}} + a_2 Y^4 + a_3 Y^6 + a_4 Y^8 + a_5 Y^{10}$$

in which X is a value of a point on a surface projected on the optical axis 0X and Y is the height of the point which is also on the meridian passing by the apex $\rho = 1/R$ is the curvature of the meridian at the apex,
K is the coefficient of conicity,
$a_i$ are the general coefficients of asphericity, the construction data of the surfaces 3, 4 and 6 are as follows:

| Surface no. 3: | $R_3 = 232.897$ |
|---|---|
| | $K_3 = -0.3539 \times 10^{-1}$ |
| | $a_1 = 0; i = 2, \ldots, 5$ |
| Surface no. 4: | $R_4 = -299.906$ |
| | $K_4 = -1.0387 \times 10$ |
| | $a_1 = 0; i = 2, \ldots, 5$ |
| Surface no. 6: | $R_6 = 2446.328$ |
| | $K_6 = -6.963 \times 10^3$ |
| | $a_1 = 0; i = 2, \ldots, 5$ |

Second embodiment: varifocal system whose field varies between approximately 10° at long focal length and 24° at short focal length (zoom ratio=2,4). The characteristics of this system are given in the following Table:

| | Short focal length | Long focal length |
|---|---|---|
| Spectral domain | 8–12 μm | 8–12 μm |
| Focal distance (mm) | 84.68 | 205.71 |
| Horizontal field | 24° | 10° |
| Numerical aperture | 4.1 | 4.1 |
| Vignetting (%) | 0 | 0 |
| Image format | 24 mm × 36 mm | 24 × 36 mm |
| Position of the entrance pupil with respect to the first dioptre (mm) | 51 | 83 |
| Position of the exit pupil with respect to the focal plane (mm) | −222 | −222 |
| MTF (Modulation Transfer Function) on the axis at spatial frequency of 5 mm$^{-1}$ | ≈0.685 | ≈0.68 |

In this modification the four lenses L1, L2, L3 and L4 do not have any aspherical surface, which results in a notable simplification of the optical system. The data for the long focal length construction are as follows:

| Number of the surface | Radius | ½ Useful diameter | Next material | Next thickness |
|---|---|---|---|---|
| 2 | 184.061 | 23.064 | Ge | 7.467 |
| 3 | 271.718 | 21.871 | Air | 12.488 |
| 4 | −268.122 | 17.435 | Ge | 4.975 |
| 5 | 436.944 | 17.170 | Air | 48.633 |
| 6 | −805.109 | 16.619 | Ge | 5.494 |
| 7 | −273.040 | 17.080 | Air | 44.322 |
| 8 | 939.345 | 24.873 | Ge | 6.520 |
| 9 | −597.199 | 25.001 | Air | 121.846 | in which "radius" denotes the radius of curvature of the surface, "next thickness" denotes the interval between the said surface and the next surface, which interval is measured along the optical axis, while "radius", "next thickness" and "½ useful diameter" are expressed in mm.

In these two embodiments the systems are designed to function between −40° C. and +80° C., i.e. 60° on either side of the nominal temperature range of 20° C. and independently of the focal distance for proximity focussing up to 40 m.

We claim:

1. A varifocal optical system controlled electro-mechanically for focal distance variation and thus magnification, temperature correction focussing and finite distance focussing, comprising four single element lenses, two of said lenses being movable and axially translatable to vary the magnification, only one of the two movable lenses being adapted for temperature correction focussing and finite distance focussing, and electro-mechanical means for controlling the movement of the two movable lenses in a discrete manner.

2. A varifocal optical system as claimed in claim 1, wherein a convergence adjustment of the two remaining non-movable lenses is carried out during assembly of the system so as to compensate for rotational errors (curvature of the lenses, thicknesses) caused during manufacture of the lenses and for positioning errors of the tubes on which said lenses are mounted.

3. A varifocal optical system as claimed in claim 1 or 2, wherein the electro-mechanical means for controlling the movements of the two movable lenses, includes a computing unit, taking into account for focussing corrections discrete proximity values and discrete temperature values computed in such a way that the image remains sharp without compensation between two successive values, the corrections being made in terms of elementary increments so that the computing unit is required to perform additions only.

4. A varifocal optical system as claimed in claim 1, whose electro-mechanical means for independently controlling the independent movements of the two movable lenses comprise two motors for moving two carriages on which the tubes for the two movable lenses are fixed, wherein the two motors are connected to the two carriages by means of two screws without clearance.

5. A varifocal optical system as claimed in claim 1, wherein temperature corrections for focussing and finite distance focussing corrections are treated in terms of perturbations with respect to the normal configuration: nominal temperature T and object situated at infinity, and in that the temperature corrections for focussing are decorrelated with the finite distance focussing corrections, which means that for a temperature T+Δt and an object at finite distance a first correction is carried out by refocussing for an object situated at infinity at the temperature T+Δt, a second correction is carried out by refocussing while taking the proximity of the object into account and assuming the temperature to be equal to T.

6. A varifocal optical system as claimed in claim 1, wherein the four lenses are constructed and adjusted in conformity with the following Table of values in which the term "radius" denotes the radius of curvature of a surface, "next thickness" denotes the interval between a said surface and the next surface, which interval is measured along the optical axis, "radius", "next thickness" and "½ useful diameter" are expressed in mm,

| Number of the surface | Radius | ½ Useful diameter | Next material | Next thickness |
|---|---|---|---|---|
| 2 | 172.779 | 58.662 | Ge | 8.659 |
| 3 | conical | 56.929 | Air | 137.553 |
| 4 | conical | 20.191 | Ge | 3.570 |
| 5 | 207.799 | 20.191 | Air | 3.010 |
| 6 | conical | 22.683 | Ge | 3.618 |
| 7 | −434.666 | 22.683 | Air | 16.108 |
| 8 | 1823.132 | 24.874 | Ge | 4.272 |
| 9 | −402.556 | 24.874 | Air | 101.605 | while the surfaces no. 3, 4 and 6 are defined in a coordinate system as follows:

Surface no. 3: $R_3 = 232.897$
$K_3 = -3539 \times 10^{-1}$
$\alpha_1 = 0; i = 2, \ldots, 5$ Surface no. 4: $R_4 = -299.906$
$K_4 = -1.0387 \times 10$
$\alpha_1 = 0; i = 2, \ldots, 5$ Surface no. 6: $R_6 = 2446.328$
$K_6 = -6.963 \times 10^3$
$\alpha_1 = 0; i = 2, \ldots, 5$ said coordinate system having orthogonal axes XOY in which O is the apex of the surfaces and OX is the optical axis, and being interpreted by the following general formula, $$X = \frac{pY^2}{1 + (1 - (K + 1)p^2 Y^2)^{0.5}} + \alpha_2 Y^4 + \alpha_3 Y^6 + \alpha_4 Y^8 + \alpha_5 Y^{10}$$

in which X is a value of a point on a surface projected on the optical axis OX, Y is the height of said point which is also on a meridian including the apex, p denotes the inverse value of the radius of curvature of said meridian at the apex, K denotes the coefficient of conicity and $\alpha_i$ denotes the general coefficients of asphericity.

7. A varifocal optical system as claimed in claim 1, wherein the four lenses do not have any aspherical surface and are realized and adjusted in conformity with the following Table of values in which the term "radius" denotes the radius of curvature of the surface, "next thickness" denotes the interval between the said surface and the next surface, which interval is measured along the optical axis, while "radius", "next thickness" and "½ useful diameter" are expressed in mm,

| Number of the surface | Radius | ½ Useful diameter | Next material | Next thickness |
|---|---|---|---|---|
| 2 | 184.061 | 23.064 | Ge | 7.467 |
| 3 | 271.718 | 21.871 | Air | 12.488 |
| 4 | −268.122 | 17.435 | Ge | 4.975 |
| 5 | 436.944 | 17.170 | Air | 48.633 |
| 6 | −805.109 | 16.619 | Ge | 5.494 |
| 7 | −273.040 | 17.080 | Air | 44.322 |
| 8 | 939.345 | 24.873 | Ge | 6.520 |
| 9 | −597.199 | 25.001 | Air | 121.846. |

\* \* \* \* \*